(12) United States Patent
Greiner

(10) Patent No.: US 12,480,022 B2
(45) Date of Patent: Nov. 25, 2025

(54) PROTECTIVE, ADHESIVE SHEET MATERIAL

(71) Applicant: Craig Greiner, Foothill Ranch, CA (US)

(72) Inventor: Craig Greiner, Foothill Ranch, CA (US)

( * ) Notice: Subject to any disclaimer, the term of this patent is extended or adjusted under 35 U.S.C. 154(b) by 225 days.

(21) Appl. No.: 18/515,058

(22) Filed: Nov. 20, 2023

(65) Prior Publication Data

US 2024/0084173 A1    Mar. 14, 2024

Related U.S. Application Data

(63) Continuation-in-part of application No. 16/902,224, filed on Jun. 15, 2020, now abandoned.

(60) Provisional application No. 62/864,377, filed on Jun. 20, 2019.

(51) Int. Cl.
| | |
|---|---|
| B32B 37/06 | (2006.01) |
| B29C 65/00 | (2006.01) |
| B29C 65/48 | (2006.01) |
| B32B 37/12 | (2006.01) |
| C09J 5/06 | (2006.01) |
| C09J 7/22 | (2018.01) |
| C09J 7/40 | (2018.01) |

(52) U.S. Cl.
CPC ............ *C09J 7/22* (2018.01); *B29C 65/4825* (2013.01); *B29C 66/0242* (2013.01); *B32B 37/06* (2013.01); *B32B 37/12* (2013.01); *C09J 5/06* (2013.01); *C09J 7/40* (2018.01); *B32B 2309/02* (2013.01); *B32B 2309/022* (2013.01); *B32B 2309/12* (2013.01); *B32B 2451/00* (2013.01); *C09J 2203/306* (2013.01); *C09J 2203/35* (2020.08); *C09J 2301/122* (2020.08)

(58) Field of Classification Search
CPC ..... B32B 37/12; B32B 37/06; B32B 2451/00; B29C 65/4825; B29C 43/24; B29C 66/0242; C09J 7/40; C09J 5/06
USPC .................................................. 156/312, 321
See application file for complete search history.

(56) References Cited

U.S. PATENT DOCUMENTS

| | | | |
|---|---|---|---|
| 6,383,328 B1* | 5/2002 | Nakada ................. | B44C 5/0453 428/537.1 |
| 2007/0126144 A1* | 6/2007 | Jin ........................ | B29C 43/245 264/210.2 |

* cited by examiner

*Primary Examiner* — Scott W Dodds
(74) *Attorney, Agent, or Firm* — Paul J. Backofen, Esq.

(57) ABSTRACT

A multilayer protective sheet material with an adhesive backing is both durable and easy to install and conforms FAA standards. This sheet material may also include on optional layer of colored pigment.

5 Claims, 1 Drawing Sheet

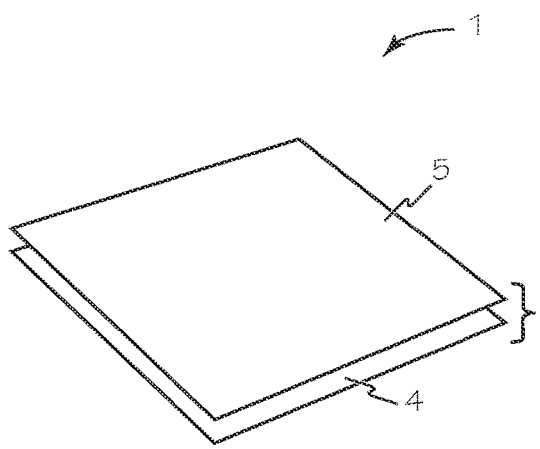
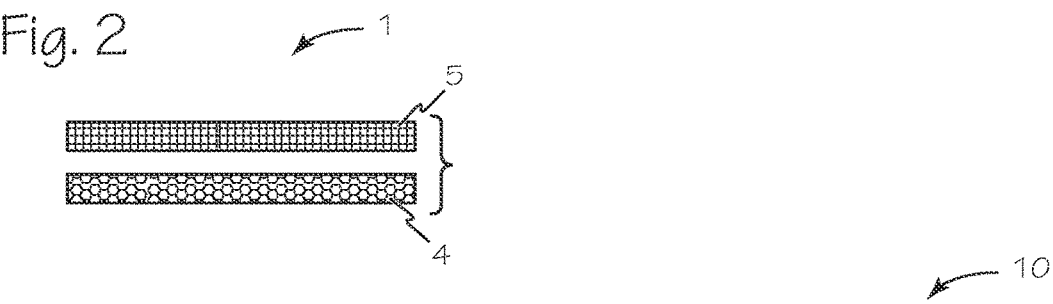
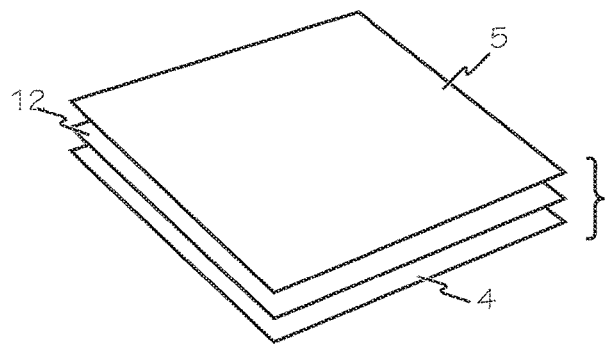
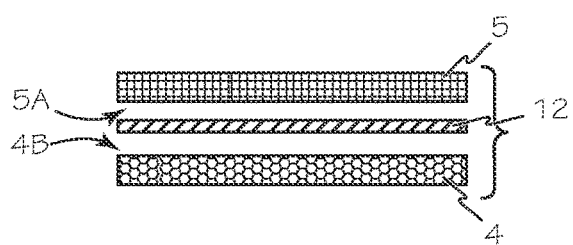
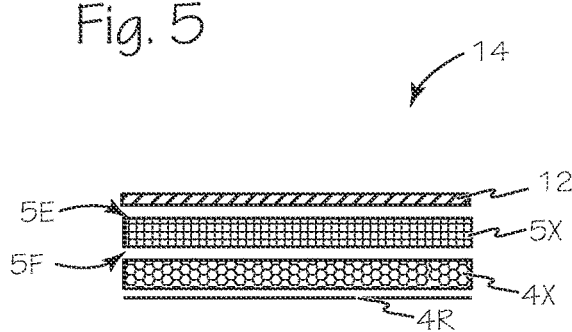

PROTECTIVE, ADHESIVE SHEET MATERIAL

This application is a continuation-in-part of co-pending U.S. application Ser. No. 16/902,224, filed Jun. 15, 2020.

FIELD OF THE INVENTIONS

The inventions described below relate to the field of protective liners for airline bulkheads, carts and bins,

BACKGROUND OF THE INVENTIONS

The airline industry spends millions of dollars annually to maintain and improve their equipment and facilities. Conventional sheet material that conforms to Federal Aviation Administration (FAA) standards for aircraft material does not provide a suitable balance between protection and ease of installation. These sheet materials are generally single color and are generally suitable for use in only a single application in an aircraft.

SUMMARY

The devices and methods described below provide for a multilayer protective sheet material with an adhesive backing that is both durable and easy to install and conforms to FAA standards. This sheet material may also include on optional layer of colored pigment. The multilayer protective sheet material is suitable for application to bulkheads, bins, carts and any other suitable locations in a commercial aircraft.

The high durability polycarbonate are melted and blended and then formed into an 8 mm solid film, either clear or cream colored. The cream colored film is heated and compressed twice to prepare it for use. The first time at 115° F. to get the material warm and soft. In this condition, the film is pressed at 80 pounds per square inch (psi). A second compression pass is performed at 200-220 psi to bond the high durability adhesive to the material. If color is added, the high durability protective sheet material and high durability adhesive layer and the pigment or color layer are processed a third time at 220° F. During the third pass at 220° F. the film and color are compressed 100 psi. The hot film, with or without color is then cooled gradually and laid flat so that it does not curl.

This unique polycarbonate is built specifically to meet FAA requirements for use in aircraft. This thermoplastic carbonate composition was specifically designed for the physical rigors of use inside of aircraft (i.e. taking punishment of baggage being forced into the overhead bins and touching/picking at the material by passengers) while simultaneously passing the rigid Federal Aviation Regulations for flammability suitable for internal aircraft markings.

BRIEF DESCRIPTION OF THE DRAWINGS

FIG. 1 is an exploded perspective view of the layers of a protective sheet material.

FIG. 2 is an exploded side view of the protective sheet material of FIG. 1.

FIG. 3 is an exploded perspective view of the layers of an alternate protective sheet material.

FIG. 4 is an exploded side view of the alternate protective sheet material of FIG. 3.

FIG. 5 is an exploded side view of a high durability protective sheet material.

DETAILED DESCRIPTION OF THE INVENTIONS

FIG. 1 is an exploded perspective view of the layers of protective sheet material 1. FIG. 2 is an exploded side view of the protective sheet material 1. Protective sheet material 1 is formed of two or more layers, adhesive layer 4 and protective layer 5. Protective layer 5 is a generally translucent top layer formed of any suitable polyvinyl fluoride such as Tedlar® or any suitable polycarbonate. Protective layer 5 is generally 8 mils (0.008") thick when it is translucent, and it may also be an opaque pre-pigmented polycarbonate that is generally 10 mils (0.010") thick. Adhesive layer 4 may be any adhesive suitable for a selected application on commercial airlines. For example, 9372 adhesive made by 3M® may be used in some applications but may not be suitable for others.

FIG. 3 is an exploded perspective view of the layers of an alternate protective sheet material 10. FIG. 4 is an exploded side view of the alternate protective sheet material 10. Protective layer 5 is an 8 mil (0.008") translucent layer and pigment layer 12 is a 2 mil thick (0.002") layer of color applied to either the inside, side 5A, of the protective layer or it may be applied to the outside, side 4B, of the adhesive layer.

In use, the choice of which type of protective layer 5 to be combined with which type of adhesive layer 4, coupled with the addition of pigment layer 12 enables the formation of protective sheet material that will comply with the safety regulations suitable for any location in a commercial vehicle. For example, material for covering the storage bins in an aircraft must comply with fire, smoke and extinguishment standards while covering for a beverage cart in a commercial aircraft must meet the fire, smoke and extinguishment standards as well as antibacterial standards. The ability to combine different protective layers with different adhesive layers with a sandwiched layer of pigment will permit these protective sheets to be used anywhere in a commercial aircraft and permit airlines to control weight and keep their fleets looking nicer longer and change coverings easier.

Alternatively, protective sheet material 14 may have high durability protective layer 5X may between the pigment layer 12 and high durability adhesive layer 4X as illustrated in FIG. 5. Protective layer 5X is formed from a proprietary polycarbonate blend which is formed into 8 mm sheets. The protective layer 5X requires heat and pressure to secure adhesive layer 4X as well as pigment layer 12 if it is included. After the film solidifies as a high durability protective layer having a first side 5E and a second side 5F, the high durability protective layer 5X is heated and compressed twice to prepare it for use. The first time, high durability protective layer 5X is compressed between 75 and 85 pounds per square inch pressure, optimally at 80 (psi) and 115° F. to get the material warm and soft. The second pass is again at 200-220° F. and between 95 and 115 psi to bond high durability adhesive layer 4X to the second side 5F of high durability protective layer 5X. High durability adhesive layer 4X may also include an optional release sheet 4R. If color is added as pigment layer 12 it is applied to first side 5E of the high durability protective layer 5X. The pigment layer is treated with any suitable solvent to improve adherence to the high durability protective layer 5X. High durability protective layer 5X, high durability adhesive layer 4X and the pigment layer 12 are processed together at 220° F. During the compression pass between 200° F. and 230° F. the protective layer, adhesive layer and the pigment layer are compressed between 95 and 115 psi. The hot protective sheet material 14, with or without color is then cooled gradually and laid flat so that it does not curl.

Depending on the ambient temperature and humidity of the environment when the protective sheet material 14 is formed, a fourth heating and compression pass may be required to insure adequate lamination of the layers. Alternatively with the correct environmental factors, the third heating and compression pass may be avoided if adequate lamination of the layers is achieved with the first two compression and heating passes.

To apply the high durability protective sheet material 14 to an aircraft surface, the high durability protective sheet material must be maintained above 70° F., the optional backing 4R is removed and the high durability protective sheet material is applied to the aircraft surface with the high durability adhesive layer 4X in contact with the aircraft surface. Removal of the high durability protective sheet material also requires heat of at least 100° F. making it unlikely that the high durability protective sheet material will delaminate in use.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A method of producing high durability protective sheet material suitable for application on aircraft comprising the steps:
    preparing a high durability polymer liquid;
    solidifying a high durability protective sheet material from the high durability polymer liquid, the high durability protective sheet material having a first and a second surface;
    compressing the high durability protective sheet material between 75 and 85 pounds per square inch pressure and at 115° F.;
    treating a pigment layer with solvent;
    applying the treated pigment layer to the first side of the high durability protective sheet material;
    applying a high durability adhesive layer to the second side of the high durability protective sheet material;
    compressing the pigment layer, the high durability protective sheet material and the high durability adhesive layer between 95 and 115 pounds per square inch pressure and 200° F. and 230° F.; and
    cooling the high durability protective sheet material and high durability adhesive layer.

2. The method of claim 1 wherein the first compressing step is performed at 80 pounds per square inch of pressure.

3. The method of claim 1 wherein the second compressing step is performed at 100 pounds per square inch of pressure and 220° F.

4. The method of claim 1 wherein the compressing step is performed at 100 pounds per square inch of pressure and 220° F.

5. A method of producing high durability protective sheet material suitable for application on aircraft comprising the steps:
    preparing a high durability polymer liquid;
    solidifying a high durability protective sheet material from the high durability polymer liquid, the high durability protective sheet material having a first and a second surface;
    compressing the high durability protective sheet material and high durability adhesive layer at 80 pounds per square inch pressure and 115° F.;
    applying a high durability adhesive layer to the second side of the high durability protective sheet material;
    applying a release sheet to the adhesive layer apposed to the high durability protective sheet material;
    treating a pigment layer with solvent;
    applying the treated pigment layer to the first side of the high durability protective sheet material;
    compressing the pigment layer, the high durability protective sheet material and the high durability adhesive layer at 100 pounds per square inch pressure and 220° F.; and
    cooling the colored high durability protective sheet material and high durability adhesive layer.

* * * * *